(12) United States Patent
Futral

(10) Patent No.: US 6,708,241 B1
(45) Date of Patent: *Mar. 16, 2004

(54) METHOD AND APPARATUS FOR PROCESSING INTERRUPTS

(75) Inventor: William T. Futral, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/479,339

(22) Filed: Jan. 7, 2000

Related U.S. Application Data

(63) Continuation-in-part of application No. 09/471,941, filed on Dec. 23, 1999.

(51) Int. Cl.⁷ ............................................. G06F 13/24
(52) U.S. Cl. ..................................................... 710/260
(58) Field of Search ................................. 710/260–269

(56) References Cited

U.S. PATENT DOCUMENTS

| | | | |
|---|---|---|---|
| 3,573,741 A | * 4/1971 | Gavril ........................... 710/5 |
| 3,832,688 A | 8/1974 | Strojny et al. |
| 4,261,034 A | 4/1981 | Saccomano et al. |
| 4,586,040 A | 4/1986 | Akiba et al. |
| 4,779,194 A | * 10/1988 | Jennings et al. ............ 709/106 |
| 4,847,893 A | 7/1989 | Dang et al. |
| 5,062,059 A | 10/1991 | Youngblood et al. |
| 5,129,063 A | 7/1992 | Sainola et al. |
| 5,144,295 A | 9/1992 | Nakagawa et al. |
| 5,163,156 A | * 11/1992 | Leung et al. ................ 709/215 |
| 5,276,863 A | 1/1994 | Heider |
| 5,495,615 A | 2/1996 | Nizar et al. |
| 5,553,293 A | 9/1996 | Andrews et al. |
| 5,555,420 A | 9/1996 | Sarangdhar et al. |
| 5,613,128 A | 3/1997 | Nizar et al. |
| 5,737,240 A | * 4/1998 | Ellsworth et al. ............ 709/214 |
| 5,758,169 A | 5/1998 | Nizar et al. |
| 5,778,221 A | * 7/1998 | Temple ........................ 712/201 |
| 5,842,026 A | 11/1998 | Wong-Chan et al. |
| 5,892,956 A | * 4/1999 | Qureshi et al. .............. 710/260 |
| 5,968,158 A | 10/1999 | Andrews et al. |
| 6,003,109 A | * 12/1999 | Caldwell et al. ............. 710/261 |
| 6,021,458 A | * 2/2000 | Jayakumar et al. .......... 710/266 |
| 6,131,131 A | 10/2000 | Bassman et al. |
| 6,185,523 B1 | * 2/2001 | Itskin et al. ................... 703/26 |
| 6,205,508 B1 | * 3/2001 | Bailey et al. ................ 710/260 |
| 6,263,395 B1 | 7/2001 | Ferguson et al. |
| 6,295,573 B1 | * 9/2001 | Bailey et al. ................ 710/260 |

OTHER PUBLICATIONS

Futral, William T., U.S. patent application No. 09/471,941; filed Dec. 23, 1999, Method and Apparatus for Processing Interrupts, 18 pages including figures.

* cited by examiner

*Primary Examiner*—Paul R. Myers
(74) *Attorney, Agent, or Firm*—Glen B. Choi

(57) ABSTRACT

Briefly, in accordance with one embodiment of the invention, a method of processing interrupts includes the following. An interrupt status message is transmitted after detecting a change in state of an interrupt. Briefly, in accordance with another embodiment of the invention, a method of processing interrupts includes the following. After receiving an end of interrupt (EOI) signal interrupting signals until an interrupt status message indicating that the interrupt state is current is recieved.

22 Claims, 5 Drawing Sheets

US 6,708,241 B1

METHOD AND APPARATUS FOR PROCESSING INTERRUPTS

RELATED APPLICATION

This is Continuation-In-Part (CIP) Patent Application of Patent application Ser. No. 09/471,941, filed on Dec. 23, 1999, titled "Method and Apparatus for Processing Interrupts," by W. T. Futral.

BACKGROUND

1. Field

This disclosure is related to processing interrupts, and, more particularly, to processing interrupts, such as input/output interrupts.

2. Background Information

The desire for expanding input/output capability for large computing systems, such as, for example, servers, has produced the ability to couple input/output subsystems to a server via a high speed serial cable, for example. This technology allows the subsystem to be physically distant or remote from the server. Present implementations employ discrete interrupt signals transmitted from input/output subsystems to interrupt controllers as part of the server's or personal computer's input/output (I/O) bus, for example. As the subsystems are physically moved from the system chassis and become remote, the feasibility of running discrete interrupt signals diminishes. A need, therefore, exists for a method or technique of processing interrupt signals in this environment.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
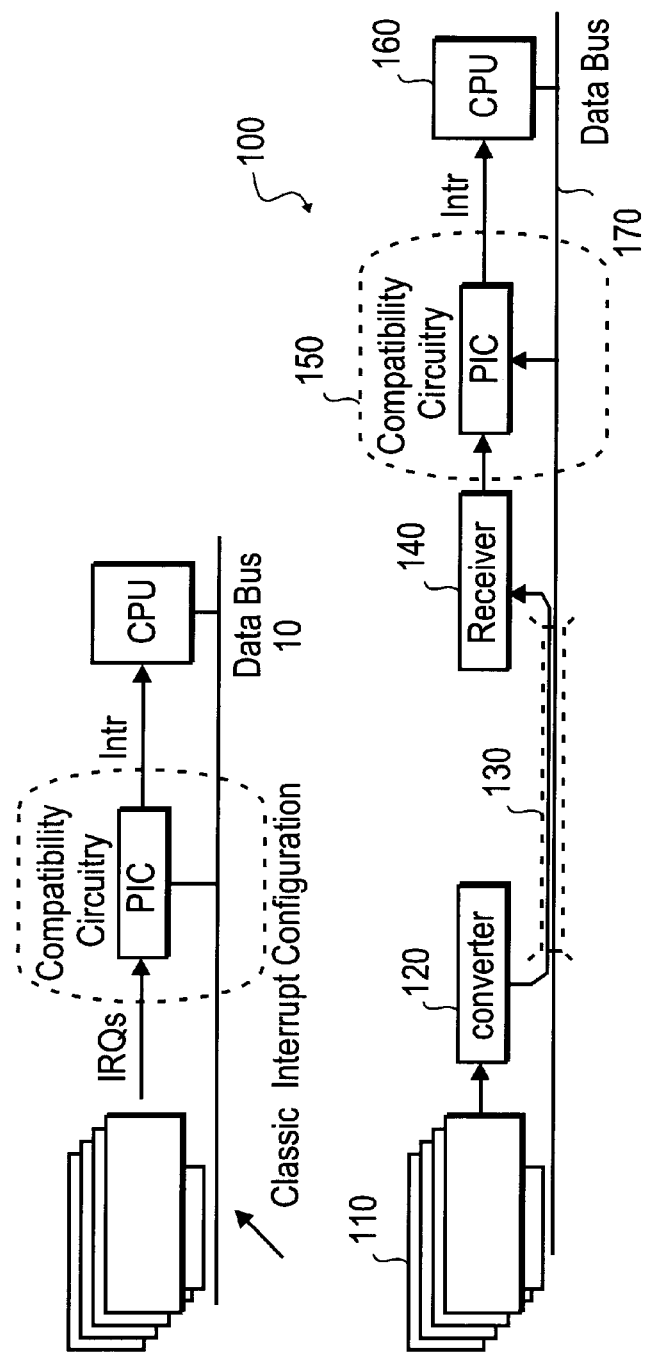
FIG. 1 is a schematic block diagram illustrating an embodiment of a system that may employ an embodiment of a method of processing interrupts in accordance with the present invention.

FIG. 1 is a schematic block diagram illustrating an embodiment of a system that may employ a method of processing interrupts in accordance with the present invention. Although the invention is not limited in scope in this respect, this particular embodiment illustrates a technology that allows a subsystem to be physically distant from the computing platform, such as, for example, a server. Therefore, in this particular embodiment, as illustrated in FIG. 1, a microprocessor (CPU) 160 is coupled to a data bus 170, which couples to input/output (I/O) cards 110. These cards in this embodiment operate to drive input and output signals to input/output devices and, likewise, receive signals from those devices. However, because the subsystems are remote or physically removed from the system chassis, the feasibility of running discrete interrupt signals diminishes. Therefore, instead, the interrupts are serialized near their source, by converter 120 in this embodiment, and shipped over the same high speed serial bus, 130 that provides the load store connectivity for the subsystem, in this embodiment. The discrete nature of the interrupts is recovered at the server by a receiver 140 and the discrete interrupts are processed by a programmable interrupt controller 150 that is compatible with an existing interrupt service or process for microprocessor 160.

One difficulty encountered with this approach is latency introduced by the serial process. Current interrupt service assumes no latency between the source of an interrupt and an interrupt controller. Therefore, introduction of latency may result in spurious interrupts, wasted microprocessor processing, and increased overhead, resulting from unproductive in the processing of such spurious interrupts. In general, the latency may introduce difficulties because the microprocessor may have serviced the interrupt over the data bus, however, due to a potential delay in clearing the interrupt, this may not be recognized and lead to a spurious interrupt. One advantage of employing an embodiment in accordance with the present invention, however, is backward compatibility. By introducing converter 120 and receiver 140, legacy input/output cards or units and programmable interrupt controllers (PICs) may be employed.

In this particular embodiment sending, the status and/or state of the interrupts at the time that the state of the interrupts change combined with the ability for the destination to sample interrupt state/status is employed. This particular embodiment takes advantage of the efficiency of technology to transmit status messages and employs a remote interrupt converter that generates an interrupt status message if it detects a change of state in an interrupt. Interrupt status messages are also transmitted in response to a message request from the target receiver in the computing platform, such as a server. In this particular embodiment, converter 120 converts level sensitive interrupts to the event driven format, that is, to a serial interrupt message form. It monitors for an interrupt status request message and for a change in interrupt state since it transmitted the last interrupt status message. In this particular embodiment, if it receives an interrupt status request message from receiver 140 and/or if it detects a change in an interrupt line in this particular embodiment, it initiates an interrupt status message that specifies the current state of all interrupt lines. Therefore, in this embodiment, it initiates a message corresponding to each occurrence of these events, although the invention is not limited in scope in this respect. The interrupt status message also identifies if it is the result of an interrupt status request message in this particular embodiment.

Figure 2:
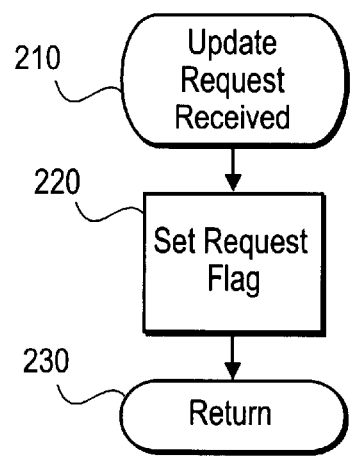
FIGS. 2 to 5 are flowcharts illustrating an embodiment of a method of processing interrupts in accordance with the present invention.
Figure 3:
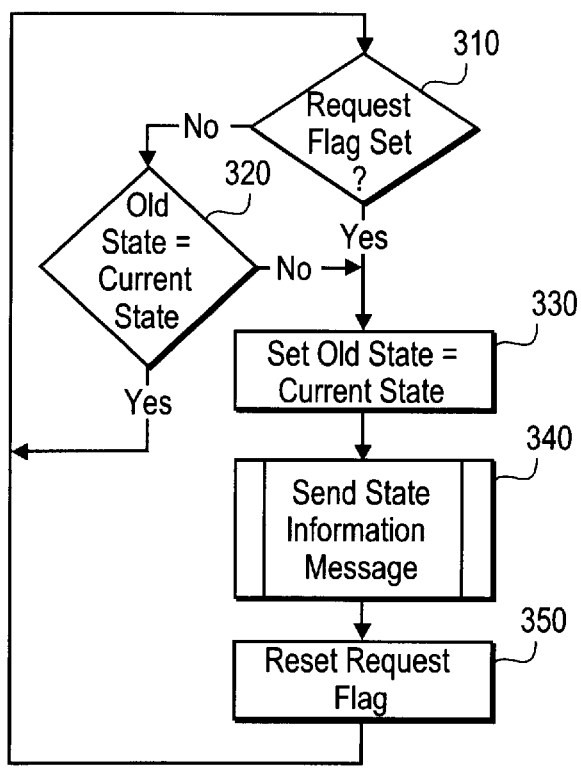

FIGS. 2 and 3 are flowcharts illustrating an embodiment of a process that may be employed by a remote interrupt converter in accordance with the, present invention. Of course, the invention is not limited in scope to this particular embodiment. FIG. 3 is a flowchart illustrating for this embodiment a process of monitoring changes in the state of the interrupts. As illustrated in FIG. 3, at block 310, the request flag is checked. Setting of the request flag shall be described in greater detail hereinafter. If the request flag is not set, then, as indicated in block 320, the interrupt state is checked to see whether it has changed. If the interrupt state has not changed, then the process returns to block 310. However, if the interrupt state has changed, the process moves to block 330, in which the current state is stored for later comparison. Then, at block 340, an interrupt status message is transmitted. At block 350, the request flag is rest. FIG. 2 illustrates a process employed the converter in this particular embodiment for responding to a request for interrupt status. As illustrated in FIG. 2, a request for interrupt status is received. At block 220, the request flag is set and, at block 230, the converter returns from this particular subprocess.

Therefore, as FIGS. 2 and 3 illustrate, in this particular embodiment, an interrupt status message is transmitted if a change in the interrupt state is detected. In this particular embodiment, this comprises detecting changes in the state of an interrupt line, although the invention is not limited in scope in this respect. Likewise, an interrupt status message is also transmitted if an interrupt status message request is detected. Again, the invention is not limited in scope in this respect.

Figure 4:
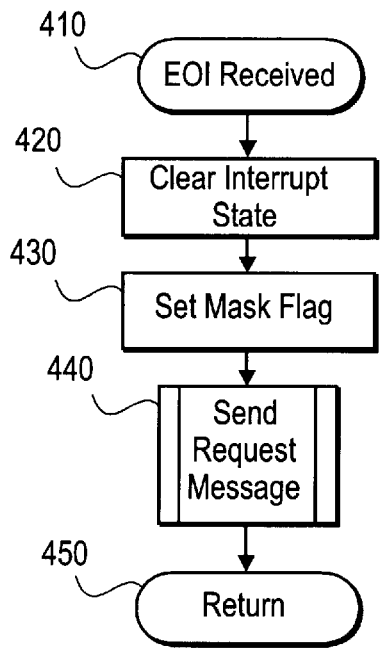
Figure 5:
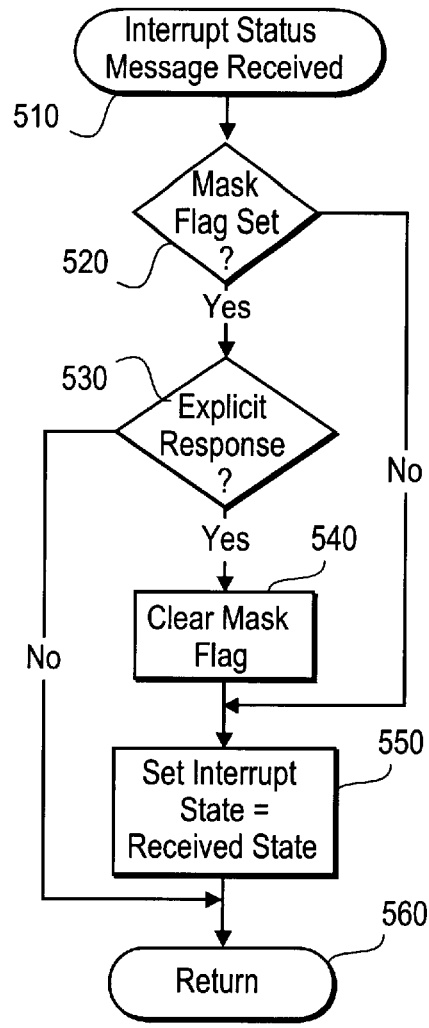

FIGS. 4 and 5 are flowcharts illustrating an embodiment of a process to be executed by an embodiment of an interrupt receiver in accordance with the present invention. In this particular embodiment, an interrupt receiver does not merely repeat the state of the discrete interrupt signals received. It also conditions the signals to inhibit spurious interrupts that may result from the delay of the assertion of the interrupt level to the peripheral interrupt controller (PIC). The microprocessor issues an interrupt acknowledge to the PIC when it begins or soon after it begins its interrupt service routine (ISR). This is a signal to the PIC to no longer drive the interrupt signal to the microprocessor. When the microprocessor finishes its interrupt service or soon after, it issues the EOI signal that signals the PIC to enable the interrupt signal to the microprocessor. Although the ISR cleared the interrupt signal at the source, the serial link delays the true status from reaching the PIC before the EOI signal. To handle this, at the time the microprocessor issues the EOI signal or soon after, the interrupt receiver masks or inhibits interrupts to the PIC until it has verified that the interrupt state is current.

Indication of an EOI signal, therefore, results in the interrupt receiver generating an interrupt status request to the remote interrupt converter and masks interrupt signals to the PIC. The interrupts remain masked or inhibited. The interrupt receiver, in this particular embodiment, should eventually receive an interrupt status message from the input/output subsystem indicating that the message is a result of the interrupt status message request. This assures that the status was generated after the time that the EOI was sign As a result of receiving this interrupt status message, then, the interrupt receiver unmasks its interrupts.

FIGS. 4 and 5 are flowcharts that illustrate implementations of this particular embodiment in accordance with the present invention. FIG. 4 illustrates an embodiment of a process that may be employed by the interrupt receiver when an EOI signal is received. Reception of the EOI signal is illustrated in block 410. Block 420 indicates the interrupt state is cleared. Block 430 indicates that the mask flag is set. Therefore, the interrupt receiver masks interrupts received as a result of this flag being set. Block 440 indicates a request from the receiver to the converter for an interrupt status message and block 450 indicates a return from this subprocess.

FIG. 5 is a flowchart illustrating an embodiment of a process to be executed by an embodiment of the interrupt receiver after an interrupt status message is received. Reception of the status message is indicated by block 510. Block 520 determines whether the mask flag is set. If the mask flag is not set, this indicates that the interrupt status message was received, indicating a change in the state of the interrupts. Therefore, in block 550, the current interrupt state is stored using the received interrupt state. Alternatively, if the mask flag is set, in block 530 it is determined if this interrupt status message is an explicit response to a request for a status message. If it is an explicit response, then the mask flag is cleared by block 540 and, again, the interrupt state is updated based on the state indicated by status message, in block 550, as previously described. However, if the message flag has been set in block 520, and this is not an explicit response to a status message request, then the process jumps to block 560 and, therefore, returns from this subprocess. The branch is taken because the status message is considered stale and not considered reliable because the explicit response to the status message request had not been received.

As previously described, this particular embodiment of a method of processing interrupts masks interrupt signals received after receiving an end of interrupt (EOI) signal until after an interrupt status message is received indicating that the interrupt state is current. Furthermore, as previously described, an interrupt status request is transmitted after receiving an end of interrupt signal. After an interrupt status message responding to the interrupt status request indicates that the interrupt state is current, the interrupt signal unmasked or no longer inhibited.

Figure 6:
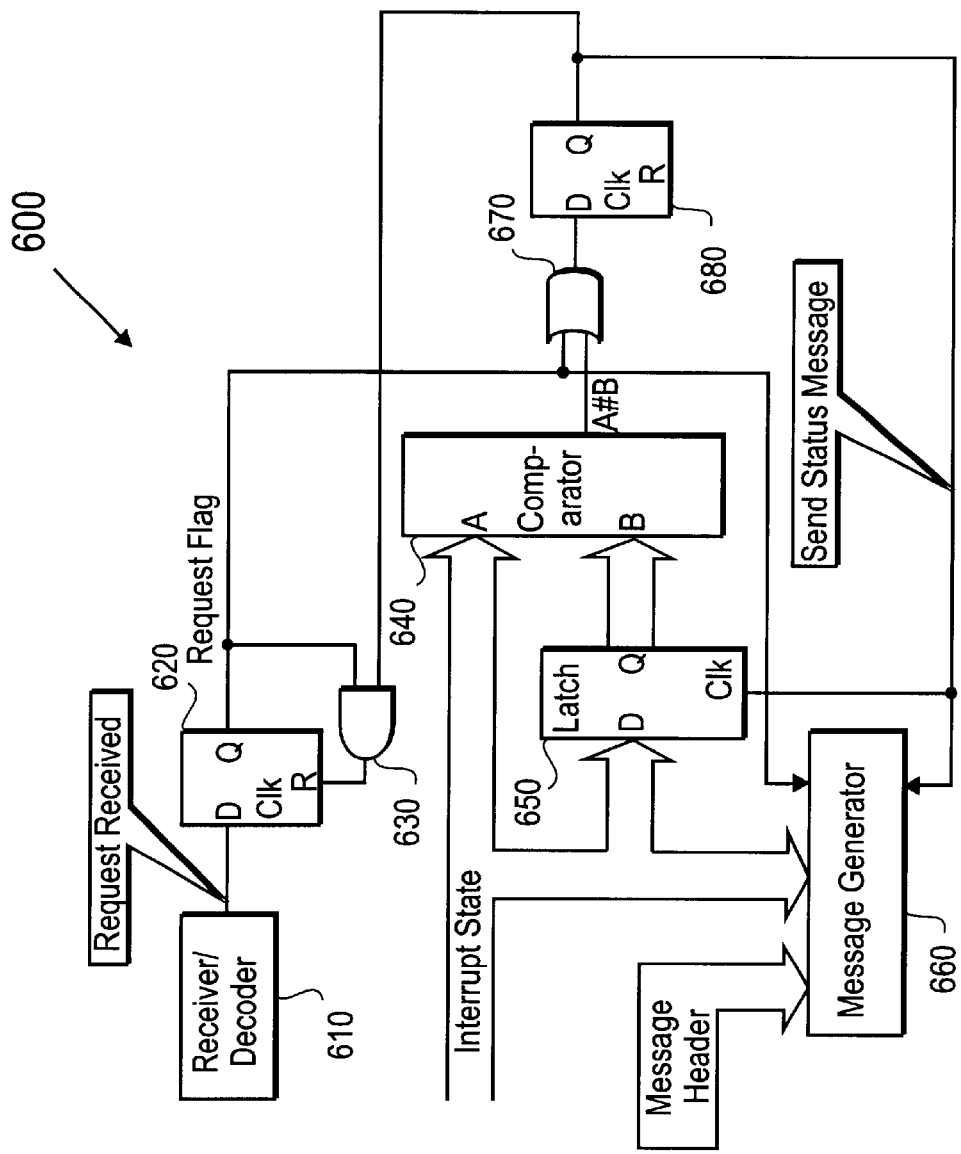
FIGS. 6 and 7 are schematic diagrams illustrating logic that may be employed for an embodiment of an apparatus for processing interrupts in accordance with the present invention.

FIG. 6 is a schematic diagram illustrating logic that may be employed to implement this particular embodiment of a converter, such as converter 120.

As illustrated in FIG. 6, flip-flops 620 and 680 are normally cleared. Receiver/decoder 610 receiving an interrupt status request results in the setting of flip-flop 620. The Q-port of flip-flop 620 is the Request Flag and indicates to the message generator 660 that the next message is in response to a received request. The Request Flag via OR gate 670 sets flip-flop 680, which instructs message generator 660 to latch the status of the Request Flag and to send the interrupt status message and the current interrupt state is saved in latch 650. Therefore, the current interrupt state, including the message header and Request Flag state, which has been combined by generator 660, will be transmitted, as desired. The Request Flag is cleared as follows. The output signal of flip-flop 680 resets flip-flop 620 via AND gate 630. The output signal of flip-flop 620 then clears flip-flop 680 through OR gate 670.

In addition, comparator 640 continuously compares the interrupt state with the previous reported state saved in latch 650. If a change has occurred so that the two states are not equal, comparator 640 sets flip-flop 680 via OR gate 670. Again, this results in message generator 660 generating an interrupt status message that contains the current information. At substantially the same time, flip-flop 680 causes latch. 650 to latch the new interrupt state. This in turn results in comparator 640 detecting that both its input signals are equal and clearing its output signal which clears flip-flop 680 via OR gate 670.

Figure 7:
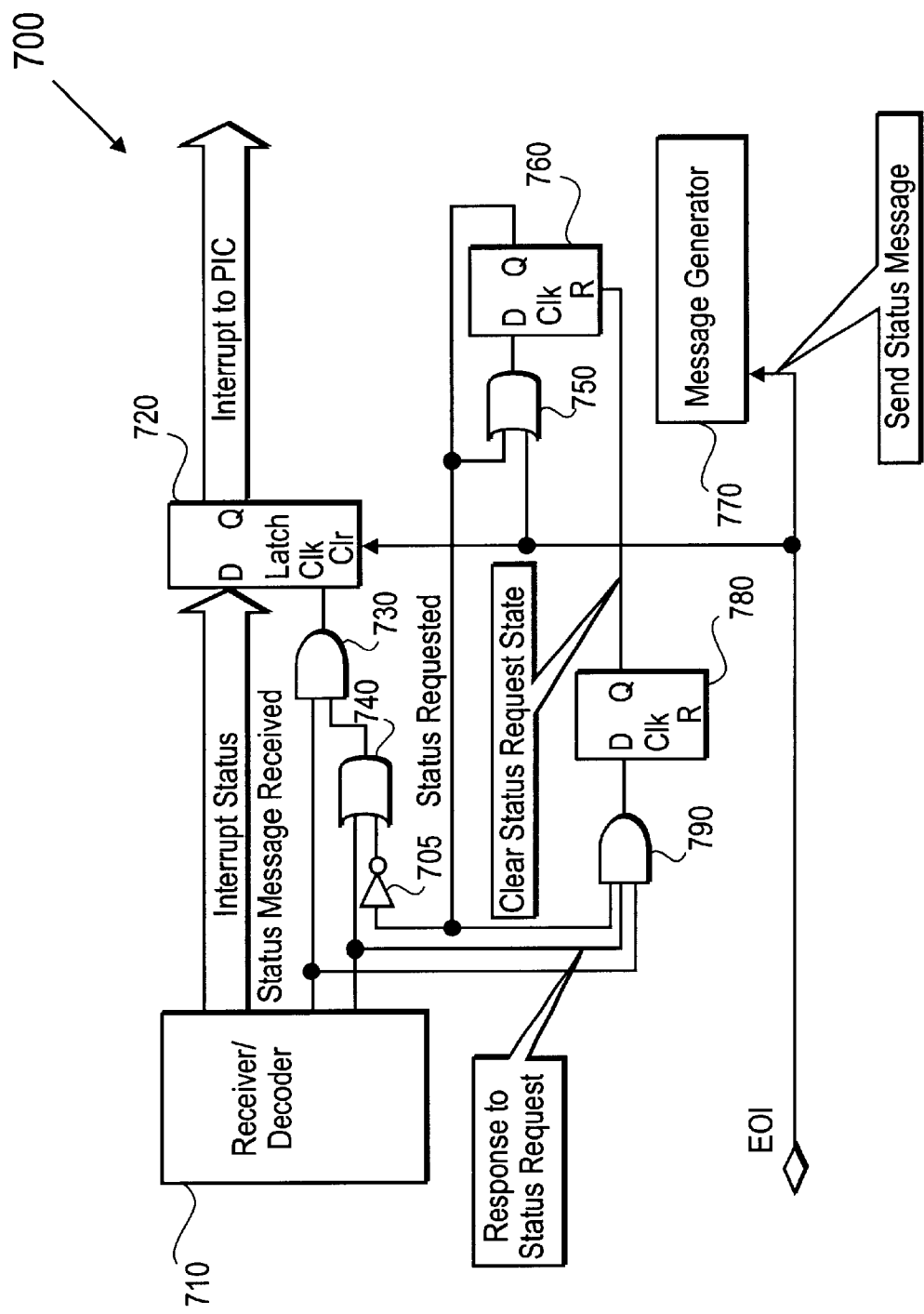

FIG. 7 is a schematic diagram illustrating logic implemented by an embodiment of an interrupt receiver in accordance with the invention, such as receiver 130.

Normally both flip-flops 760 and 770 are cleared. Thus, the output signal of flip-flop 760 via inverter 765 drives the output signal of OR gate 740 "high" such that when receiver/decoder 710 receives a status message, the "status message received" signal to AND gate 730 results in latch 720 latching the interrupt status. When this occurs, latch 720 is clocked, and the new interrupt status signal information is provided to the PIC.

When the end of interrupt (EOI) signal is asserted, as indicated in FIG. 7, it clears the output signal of latch 720, essentially masking the interrupt status signal information to the PIC, and signals message generator 770 to send an interrupt status request message. The EOI signal also, via OR gate 750, sets flip-flop 760, which indicates that an interrupt status message request has been made. From then on, received interrupt status messages are inhibited via inverter 765 until a received interrupt status message indicates that it is a response to the request for interrupt status. This is accomplished using the logic of AND gate 730 and OR gate 740. Now, when receiver/decoder 710 receives an interrupt status message, the interrupt status information is still provided to latch 720. However, latch 720 is not clocked unless the received status message indicates that it is a response to the request for status. Thus, latch 720 is clocked when the "status request" line to OR gate 740 enables AND gate 730, and thus, interrupt status signal information is again provided to the PIC. Likewise, this also clears flip-flop 780, via AND gate 790. Flip-flop 780 then resets flip-flop 760, which in turn clears flip-flop 780 via AND gate 790, thus re-enabling the normal operation.

While certain features of the invention have been illustrated as described herein, many modifications, substitutions, changes, and equivalents will now occur to those skilled in the art. It is, therefore, to be understood that the appended claims are intended to cover all such embodiments and changes as fall within the true spirit of the invention.

What is claimed is:

1. A method of processing interrupts for a computing system including a remote subsystem comprising:
    transmitting from the remote subsystem an interrupt message that specifies a current state of at least two of a plurality of interrupt lines if a change in an interrupt state of a selected interrupt line is detected, wherein the selected interrupt line is one among the plurality of interrupt lines.

2. The method of claim 1, wherein transmitting an interrupt message comprises transmitting an interrupt status message.

3. The method of claim 2, and further comprising:
    transmitting an interrupt status message from the remote subsystem also if an interrupt status request is detected.

4. The method of claim 1, wherein the computing system includes a microprocessor to process the interrupts.

5. The method of claim 1, wherein the computing system and remote subsystem are coupled via a serial bus.

6. The method of claim 5, wherein transmitting an interrupt message comprises transmitting the message serially across the serial bus.

7. A method of processing Interrupts comprising:
    masking interrupt signals after receiving an end of interrupt (EOI) signal; and
    no longer masking interrupt signals after receiving an Interrupt status message indicating that the interrupt state is current.

8. The method of claim 7, and further comprising:
    transmitting an interrupt status request after receiving the EOI signal.

9. A method of processing interrupts comprising:
    masking interrupt signals after receiving an end of interrupt (EOI) signal;
    no longer masking interrupt signals after receiving an interrupt status message indicating that the interrupt state is current;
    transmitting an interrupt status request after receiving the EOI signal, wherein no longer masking interrupt signals comprises:
        no longer masking interrupt signals after receiving an interrupt status message, the interrupt status message being responsive to the interrupt status request transmitted after receiving the EOI signal, the interrupt status request indicating that the interrupt state is current.

10. A system comprising:
    a primary computing system; and a remote subsystem;
    said primary system and said subsystem being coupled by a serial bus;
        wherein said computing system includes a receiver to reconfigure serialized messages to be received by said primary system via the serial bus;
        wherein said subsystem includes a converter to serialize messages to be transmitted to said primary system via the serial bus; and
        wherein said subsystem is further adapted to transmit an interrupt message that specifies a current state of at least two of a plurality of interrupt lines if a change in interrupt state of a selected interrupt line is detected, wherein the selected interrupt line is one among the plurality of interrupt lines.

11. The system of claim 10, wherein said subsystem is further adapted to transmit an interrupt status message if a change in interrupt state is detected.

12. The system of claim 11, wherein said subsystem is further adapted to transmit an interrupt status message also if an interrupt status request is detected.

13. The system of claim 10, wherein said primary system includes a microprocessor to process the interrupts.

14. A system comprising:
    a primary computing system; and a remote subsystem;
    said primary system and said subsystem being coupled by a serial bus;
    wherein said computing system includes a receiver to reconfigure serialized messages to be received by said primary system via the serial bus;
        wherein said subsystem includes a converter to serialize messages to be transmitted to said primary system via the serial bus; and
        said receiver being adapted to mask interrupt signals after receiving an end of interrupt (EOI) signal and being adapted to no longer masking interrupt signals after receiving an interrupt status message indicating that the interrupt state is current.

15. The system of claim 14, wherein said primary system is adapted to transmit an interrupt status request after receiving the EOI signal.

16. A system comprising:
    a primary computing system; and a remote subsystem;
    said primary system and said subsystem being coupled by a serial bus,
    wherein said computing system includes a receiver to reconfigure serialized messages to be received by said primary system via the serial bus;
        wherein said subsystem includes a converter to serialize messages to be transmitted to said primary system via the serial bus; and said receiver being adapted to mask interrupt signals after receiving an end of interrupt (EOI) signal and being adapted to no longer masking interrupt signals after receiving an interrupt status message indicating that the interrupt state is current, wherein said primary system is adapted to transmit an interrupt status request after receiving the EOI signal, wherein said primary system is further adapted to no longer mask interrupt signals after receiving an interrupt status message, the interrupt status message being responsive to the interrupt status request transmitted after receiving the EOI signal, the interrupt status request indicating that the interrupt state is current.

17. An apparatus comprising:

a receiver to reconfigure serialized messages to be received by said receiver via a serial bus coupling said receiver and a subsystem;

said receiver is adapted to be employed in a primary computing system;

said receiver being further adapted to mask interrupt signals after receiving an end of interrupt (EOI) signal from said subsystem and being adapted to no longer masking interrupt signals after receiving an interrupt status message from said subsystem indicating that the interrupt state is current.

18. The apparatus of claim 17, wherein said primary computing system is adapted to transmit an interrupt status request after receiving the EOI signal.

19. An apparatus comprising:

a receiver to reconfigure serialized messages to be received by said receiver via a serial bus coupling said receiver and a subsystem;

said receiver is adapted to be employed in a primary computing system, said receiver being further adapted to mask interrupt signals after receiving an end of interrupt (EOI) signal from said subsystem and being adapted to no longer masking interrupt signals after receiving an interrupt status message from said subsystem indicating that the interrupt state is current, wherein said primary computing system is adapted to transmit an interrupt status request after receiving the EOI signal, wherein said receiver is further adapted to no longer mask interrupt signals after receiving an interrupt status message from said subsystem, the interrupt status message being responsive to the interrupt status request transmitted after receiving the EOI signal, the interrupt status request indicating that the interrupt state is current.

20. An apparatus comprising:

a converter to serialize messages to be transmitted to a primary computing system via a serial bus coupling said converter and said primary computing system;

said converter adapted to be employed in a remote subsystem; and said converter being further adapted to transmit an interrupt message that specifies a current state of at least two of a plurality of interrupt lines to said primary system if a change in interrupt state of a selected interrupt line of said subsystem is detected, wherein the selected interrupt line is one among the plurality of interrupt lines.

21. The system of claim 20, wherein said converter is further adapted to transmit the interrupt message as an interrupt status message if a change in interrupt state is detected.

22. The system of claim 21, wherein said converter is further adapted to transmit an interrupt status message also if an interrupt status request is detected.

\* \* \* \* \*

UNITED STATES PATENT AND TRADEMARK OFFICE
CERTIFICATE OF CORRECTION

PATENT NO. : 6,708,241 B1
DATED : March 16, 2004
INVENTOR(S) : Futral

It is certified that error appears in the above-identified patent and that said Letters Patent is hereby corrected as shown below:

<u>Title page,</u>
Item [57], ABSTRACT,
Lines 7-8, after "(EOI) signal", delete "interrupting signals", insert -- , interrupt signals are masked --.

<u>Column 3,</u>
Lines 9, delete "rest", insert -- reset --.
Line 10, after "a process employed", insert -- by --.
Line 54, delete "sign", insert -- signaled. --.

<u>Column 4,</u>
Line 30, delete "signal", insert -- signals are --.

Signed and Sealed this

Eighteenth Day of May, 2004

JON W. DUDAS
*Acting Director of the United States Patent and Trademark Office*